United States Patent
Mair

(10) Patent No.: US 8,457,849 B2
(45) Date of Patent: Jun. 4, 2013

(54) CONTROLLER FOR AUTOMATED VARIABLE-SPEED TRANSMISSION IN A MOTOR VEHICLE WITH ALL-WHEEL DRIVE

(75) Inventor: Roland Mair, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 584 days.

(21) Appl. No.: 12/669,102

(22) PCT Filed: Jun. 19, 2008

(86) PCT No.: PCT/EP2008/057752
§ 371 (c)(1),
(2), (4) Date: Jan. 14, 2010

(87) PCT Pub. No.: WO2009/015939
PCT Pub. Date: Feb. 5, 2009

(65) Prior Publication Data
US 2010/0198469 A1 Aug. 5, 2010

(30) Foreign Application Priority Data
Jul. 27, 2007 (DE) .......................... 10 2007 035 296

(51) Int. Cl.
*F16H 61/16* (2006.01)
*F16H 59/66* (2006.01)
*F16H 48/20* (2012.01)

(52) U.S. Cl.
USPC ........................................................ 701/65

(58) Field of Classification Search
USPC ........................................................ 701/65
See application file for complete search history.

(56) References Cited

U.S. PATENT DOCUMENTS

| | | | | |
|---|---|---|---|---|
| 4,298,085 A | * | 11/1981 | Moroto et al. ................ | 180/247 |
| 4,552,241 A | * | 11/1985 | Suzuki .......................... | 180/249 |
| 4,671,373 A | * | 6/1987 | Sigl .............................. | 180/197 |
| 4,700,797 A | * | 10/1987 | Leiber .......................... | 180/197 |
| 4,840,247 A | * | 6/1989 | Kashihara et al. ............ | 180/249 |
| 4,866,624 A | * | 9/1989 | Nishikawa et al. ........... | 701/89 |
| 4,872,372 A | * | 10/1989 | Bantle et al. ................. | 475/150 |
| 5,060,746 A | * | 10/1991 | Nobumoto et al. ........... | 180/197 |
| 5,262,952 A | * | 11/1993 | Tsuyama et al. .............. | 701/87 |
| 5,927,422 A | * | 7/1999 | Schakel ........................ | 180/197 |
| 5,931,762 A | | 8/1999 | Koyama et al. | |
| 6,077,190 A | * | 6/2000 | Tabata et al. ................. | 477/97 |
| 6,584,398 B1 | * | 6/2003 | Erban ........................... | 701/82 |
| 6,668,671 B2 | | 12/2003 | Loeffler et al. | |
| 6,782,962 B2 | * | 8/2004 | Michioka et al. ............ | 180/197 |
| 7,276,015 B2 | * | 10/2007 | Stervik ......................... | 477/110 |
| 7,369,931 B2 | | 5/2008 | Kjell et al. | |
| 7,770,681 B2 | * | 8/2010 | Marathe et al. .............. | 180/197 |
| 8,014,926 B2 | * | 9/2011 | Sawada ......................... | 701/55 |
| 2008/0103018 A1 | * | 5/2008 | Peura et al. ................... | 477/35 |

FOREIGN PATENT DOCUMENTS

| | | | |
|---|---|---|---|
| DE | 33 34 721 A1 | | 4/1985 |
| DE | 3808787 A1 | * | 9/1988 |
| DE | 39 25 138 A1 | | 2/1990 |
| DE | 103 18 498 A1 | | 11/2004 |
| DE | 10 2005 050 479 A1 | | 5/2007 |
| EP | 1 580 465 A2 | | 9/2005 |
| JP | 62251552 A | * | 11/1987 |
| JP | 62261537 A | * | 11/1987 |
| JP | 62261538 A | * | 11/1987 |
| JP | 01197128 A | * | 8/1989 |
| JP | 10212982 A | * | 8/1998 |
| JP | 2005299896 A | * | 10/2005 |
| JP | 2007168695 A | * | 7/2007 |
| WO | 02/16806 A1 | | 2/2002 |

OTHER PUBLICATIONS

Translation of JP 01-197128 A.*
EPO machine translation of DE 3808787.*
Mercedes-Benz G-Class Differential Locks brochure, 217 HO Differential Locks, (ACB ICC), Feb. 5, 2003, published in 2003, downloaded from http://fourbyfourclub.com/Manuals/W463249DiffLocks.pdf.*
Translation of JP 01-197128 A (original JP document published Aug. 8, 1989).*
EPO machine translation of DE 3808787 (original DE document published Sep. 29, 1988).*

* cited by examiner

*Primary Examiner* — James Trammell
*Assistant Examiner* — David Testardi
(74) *Attorney, Agent, or Firm* — Davis & Bujold, PLLC

(57) ABSTRACT

A method of controlling an automated variable-speed transmission in a drivetrain of a motor vehicle having all-wheel drive in which, during driving operation under difficult ground conditions, measures are provided for suppression of the automatic shift processes. To reliably prevent undesired automatic shift processes when the vehicle is in an all-wheel drive mode on difficult terrain, particularly also in combination with active differential locks, currently active traction-related mechanisms are evaluated by a plausibility check taking into account detection of wheel slippage, and the measures for suppressing automatic shift processes are carried out as a function of the evaluation.

15 Claims, No Drawings

CONTROLLER FOR AUTOMATED VARIABLE-SPEED TRANSMISSION IN A MOTOR VEHICLE WITH ALL-WHEEL DRIVE

This application is a National Stage completion of PCT/EP2008/057752 filed Jun. 19, 2008, which claims priority from German patent application serial no. 10 2007 035 296.6 filed Jul. 27, 2007.

FIELD OF THE INVENTION

The invention concerns a method for controlling an automated change-speed transmission in a drivetrain of a motor vehicle with all-wheel drive.

BACKGROUND OF THE INVENTION

In motor vehicles whose drivetrain comprises an automated change-speed transmission and an automated starting clutch, automatic shift processes are carried out for starting and for gearshifts by means of an electronic control unit which detects various operation-relevant sensor data, such as engine speed, transmission input speed, accelerator pedal position, driving speed and shifting intention among others, and after evaluating them, initiates clutch disengagement and engagement and a change of transmission ratio by means of correspondingly controllable actuator systems.

Automated change-speed transmissions have already proved their worth as very effective geared transmission systems in motor vehicles. However, in contrast to automatic transmissions that change under load, and apart from dual-clutch systems in which gears are shifted by two clutches acting with overlap in a sequential change, they are characterized by an interruption of the traction force because the starting clutch is always disengaged during the shifting process.

Under difficult ground conditions, for example on difficult terrain or in general when the ground surface is slippery, motor vehicles designed in this way can behave problematically if an automatic gearshift is initiated suddenly while driving. For example when driving on sand or on an icy road with slipping wheels, a shift can cause the vehicle to stop or become stuck when the traction force is interrupted. If the automatic shift can be carried out at all and the clutch is then closed again, the slippage is possibly increased with the result of severe wheel-spin of the driven wheels. This can sometimes bring the movement of the vehicle to an undesired stop.

To prevent that, transmission control systems are already known with which no automatically initiated shifts are carried out, if it has been recognized that wheel-slip is taking place on at least one wheel of the vehicle. This can be done, with the help of appropriate signals, by a brake system or by the drive engine in that actuation of a vehicle stabilizing system, for example a drive slip regulation (ASR) is communicated to the transmission control unit, and/or in that the wheel speeds or wheel rotational speeds of the driven and non-driven wheels are compared with one another.

Furthermore, motor vehicles with all-wheel drive that is permanent or which can be activated are known. All-wheel drive is advantageous due to improved traction, especially on difficult terrain or on a slippery road. In all-wheel drive vehicles, however, wheel-slip recognition as the criterion for suppressing automatic shift processes can sometimes prove ineffective. It is true that basically, in the case of permanent all-wheel drive and all-wheel drive that can be activated and operated with variable drive torque, wheel rotational speed comparisons can be used to determine wheel slip. Often, however, precisely in difficult ground conditions, differential locks are activated in addition to the all-wheel drive. In vehicles with all-wheel drive combined with active differential locks on all the driven axles, as a rule all the wheels necessarily have the same speed or rotational speed and conventional wheel rotational speed comparisons can no longer be used to determine whether or not wheel slip is taking place. Despite this, there is still a need not to carry out any automatic shifts, if slip of the vehicle's wheels is occurring. Until now no control methods have been known which overcame this problem satisfactorily.

Basically, an operating element could be provided which enables the driver to switch off an automatic shift mode. However, this would presuppose that the driver anticipates the risk of wheel slip and switches off the automatic shift mode before the control system can initiate a shift operation, possibly when wheel-spin is about to begin. There is also the risk that in an occasional difficult driving situation the driver would have too much to do, or would at least be distracted, if he had to operate an additional switch.

It would also be conceivable to have a sensor system that analyzed the vehicle and its surroundings with reference to a relative position or relative movement, to determine whether, when its driven wheels are turning, the vehicle is actually moving ahead at a speed corresponding to the wheel speed. However, that would entail relatively high costs and implementation complexity.

SUMMARY OF THE INVENTION

Against this background the purpose of the present invention is to indicate a method for the reliable prevention of undesired shift operations in an all-wheel drive vehicle with an automated change-speed transmission, by the simplest possible means, when the ground conditions are difficult.

The invention is based on the recognition that in a vehicle with all-wheel drive, in which a differential lock is activated on at least one driven axle, it can be assumed that a difficult driving situation with a potential for wheel slip on difficult terrain or slippery ground exists, so that no automatic shifts should take place.

DETAILED DESCRIPTION OF THE PREFERRED EMBODIMENTS

Accordingly, the invention begins with a method for controlling an automated change-speed transmission in a drivetrain of a motor vehicle with all-wheel drive, in which during driving operation under difficult ground conditions measures are provided for the suppression of automatic shift processes. To achieve the stated objective the invention provides that currently active traction-related means are evaluated in a plausibility check taking into account the detectability of wheel slip, and the measures for suppressing automatic shift operations are carried out as a function of the evaluation.

In a vehicle with all-wheel drive combined with activated differential locks, the method according to the invention described in greater detail below advantageously enables the control function "suppression of automatic shift operations in the event of slip and/or potential slip". In this way possibly disadvantageous traction force interruptions in such driving situations are avoided.

An automatic shift is understood to be a shift operation initiated automatically by a control system in order to change a transmission ratio in an automated change-speed transmission. Usually, information in the form of sensor signals or switch positions is available to a control unit in the vehicle, in particular the transmission control system, which indicates the activation of differential locks and the activation of the all-wheel drive, for example by means of the shift position of a transfer box. With reference to the driven wheels and activated locks it can then be determined whether, when and between which vehicle wheels slip can still occur in principle. The wheel speeds of those wheels can then be used as intended, to determine slip by comparison.

If all the wheels are compelled by the locks to turn at the same speed, wheel spin can no longer be recognized directly. However, in practice a vehicle is only operated with all locks active under difficult conditions of use, so that when the locks are active it can be assumed that the possibility of slip or a difficult driving situation exists, in which automatic shifts should not take place.

Correspondingly it can be advantageously provided that automatic shifts are suppressed when all the vehicle's axles are being driven by the all-wheel drive and differential locks are activated on all the axles. In this way it is achieved by simple and inexpensive means that in all-wheel drive vehicles with locked differentials, no inappropriate automatic shifts take place under conditions of difficult terrain.

Since even a single active lock on one of the drive axles already indicates a difficult driving situation, it can advantageously be provided that regardless of whether wheel slip is actually taking place, automatic shifts are already suppressed when all the vehicle's axles are being driven by the all-wheel drive and a differential lock is activated on at least one axle.

As a reaction to a recognized wheel slip or to the message "differential lock or locks active", a measure for the suppression of automatic shift processes can be provided, whereby an automatic shift function of a transmission control system is deactivated automatically and is only reactivated if the driver specifically calls for this, for example by actuating a suitable operating element. Automatic deactivation of the automatic shift function when wheel slip is recognized or at least potentially expected because of activated differential locks is particularly comfortable and safe, since in such situations (difficult terrain, slippery surface etc.) the driver can concentrate fully on controlling the vehicle and is not distracted by the operation of additional switches.

In principle, however, it is also possible to provide a device for the driver to deactivate an automatic shift function manually, for example a key switch on the transmission selector lever, and to transmit to the driver a deactivation recommendation in reaction to recognized wheel slip or to the signal "differential lock or locks active", for example in the form of a visual, acoustic and/or tactile signal.

It is also possible for the automatic shift function to be only temporarily deactivated, and reactivated automatically when the evaluation conditions that led to deactivation have disappeared or at least have changed. In this case therefore, the automatic shift function suspends its activity for as long as the corresponding situation persists and resumes it as soon as the situation no longer exists, i.e. there is no longer any wheel slip or the engaged differential locks are released again.

Finally, it can be provided that when the automatic shift function is deactivated, manual shifts can still be carried out, i.e. shifts initiated by the driver by actuating a transmission selector lever or a related shift rocker. Advantageously, this makes it possible for the driver to react flexibly in accordance with his perceptions and, at suitable moments, change the currently engaged transmission ratio while allowing for a traction force interruption when it seems right to do this in order to control a situation.

The invention claimed is:

1. A method for controlling an automated variable-speed transmission in a drivetrain of an all-wheel drive motor vehicle to prevent automatic shifting of the transmission when the motor vehicle is operating on slippery ground or difficult ground conditions on which there exists a potential for wheel slip, the motor vehicle having a plurality of axles and wheels, which are drivable by an all-wheel drive, and each of the axles having a differential lock, the method comprising the steps of:
   providing information, which indicates activation of the differential locks, to a transmission control unit;
   comparing rotational speeds of the wheels to determine wheel slip; and
   preventing, via the transmission control unit, all automatic shifts of the transmission of the motor vehicle in the event of at least one of the differential locks being active and slipping of at least one of the wheels being detected.

2. The method according to claim 1, further comprising the step of, when all of the axles of the vehicle are driven by the all-wheel drive and the differential locks on all of the axles are active, preventing all of the automatic shifts of the transmission.

3. The method according to claim 1, further comprising the step of, when all of the axles of the vehicle are driven by the all-wheel drive and the differential lock on at least one of the axles is active, preventing all of the automatic shifts.

4. The method according to claim 1, further comprising the step of automatically deactivating an automatic shift function of a transmission control system to prevent the automatic shifts of the transmission.

5. The method according to claim 4, further comprising the step of, when the automatic shift function is deactivated, initiating shifts of the transmission when a driver manually actuates either a transmission selector lever or a shift rocker.

6. The method according to claim 4, further comprising the step of reactivating automatic shifts of the transmission when a driver actuates an operating element.

7. The method according to claim 4, further comprising the step of automatically reactivating the automatic shift function, when the differential locks are inactive and slipping of the wheels is not detected.

8. The method according to claim 1, further comprising the steps of preventing automatic shifts of the transmission when a driver manually deactivates the automatic shifts with a shift deactivation device, and transmitting a signal to the driver, the signal corresponding to a recommendation for preventing automatic shifts of the transmission.

9. The method according to claim 1, further comprising the step of preventing automatic shifts of the transmission when at least one differential lock is active.

10. A method of suppressing automatic shift processes an automated variable-speed transmission of a drivetrain of a motor vehicle having all-wheel drive while driving the motor vehicle on slippery ground or an adverse driving surface on which there exists a potential for wheel slip, the motor vehicle having a plurality of axles and wheels, which are drivable by the all-wheel drive, and each of the axles having a differential lock, the method comprising the steps of:
   providing information, which indicates activation of at least one of the differential locks, to a transmission control unit; and,
   comparing, with the transmission control unit, rotational speeds of the wheels to determine if any of the wheels of the vehicle is slipping; and
   preventing all automatic shifts of transmission ratios, via the transmission control unit, when at least one of the differential locks is active and at least one of the wheels of the vehicle is slipping.

11. The method according to claim 10, further comprising the step of preventing all automatic shifts of the transmission ratios when all of the vehicle axles are driven by the all-wheel drive and the differential locks of all of the vehicle axles are activated.

12. The method according to claim 10, further comprising the step of preventing all automatic shifts of the transmission ratios when all of the vehicle axles are driven by the all-wheel drive and the differential lock is activated on at least one the vehicle axles.

13. The method according to claim 12, further comprising the step of automatically deactivating an automatic shift function of a transmission control system to prevent the automatic shifts.

14. The method according to claim 13, further comprising the step of, when the automatic shift function is deactivated, manually initiating shift functions.

15. The method according to claim 13, further comprising the step of, when an evaluation condition that led to the shift function deactivation changes, automatically reactivating the automatic shift function.

\* \* \* \* \*